US012675720B2

(12) United States Patent
Miller et al.

(10) Patent No.: US 12,675,720 B2
(45) Date of Patent: Jul. 7, 2026

(54) MEASURING A N-DIMENSIONAL QUANTUM SYSTEM

(71) Applicant: International Business Machines Corporation, Armonk, NY (US)

(72) Inventors: Daniel Miller, Wädenswil (CH); Laurin Elias Fischer, Zürich (CH); Panagiotis Barkoutsos, Zurich (CH); Francesco Tacchino, Rueschlikon (CH); Daniel Josef Egger, Thalwil (CH); Ivano Tavernelli, Wädenswil (CH)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 18/159,523

(22) Filed: Jan. 25, 2023

(65) Prior Publication Data

US 2024/0119328 A1 Apr. 11, 2024

(30) Foreign Application Priority Data

Sep. 23, 2022 (GR) .............................. 20220100780

(51) Int. Cl.
*G06N 10/20* (2022.01)
(52) U.S. Cl.
CPC .................................. *G06N 10/20* (2022.01)
(58) Field of Classification Search
None
See application file for complete search history.

(56) References Cited

U.S. PATENT DOCUMENTS

2018/0165601 A1* 6/2018 Wiebe .................... G06N 20/00
2019/0266512 A1* 8/2019 Shen ...................... G06N 10/40
2020/0226487 A1 7/2020 Radin et al.

FOREIGN PATENT DOCUMENTS

CN 108182477 A 6/2018

OTHER PUBLICATIONS

"Ancilla dimensions needed to carry out positive-operator-valued measurement", Chen et al., 2007, 4 pages (Year: 2007).*
"Ancilla-free implementation of generalized measurements for qubits embedded in a qudit space", Fischer et al., 2022, 19 pages ( Year: 2022).*

(Continued)

*Primary Examiner* — Haimei Jiang
(74) *Attorney, Agent, or Firm* — Scott Dobson

(57) ABSTRACT

The present disclosure relates to a quantum system of dimension M comprising a transmon device. The transmon device is in an initial state $\rho_{ini}$ which is restricted to a state $\rho_S$ of a N-dimensional quantum system embedded in the quantum system, where N<M. The transmon device is configured to receive a sequence of pulses for transforming the initial state $\rho_{ini}$ to a state $\rho_{ext}$ of the quantum system. The transmon device is connected to a readout that is configured to perform a projection-valued measure (PVM) of the transmon device in its state $\rho_{ext}$.

20 Claims, 6 Drawing Sheets

(56) References Cited

OTHER PUBLICATIONS

Chen et al., "Ancilla dimensions needed to carry out positive-operator-valued measurement," Physical Review A 76, 060303(R) (2007): 060303, https://doi.org/10.1103/PhysRevA.76.060303, 4 pgs.

D'Ariano et al., "Informationally complete measurements on bipartite quantum systems: comparing local with global measurements," https://arxiv.org/abs/quant-ph/0507104, Jul. 12, 2005, 8 pgs.

Fischer et al., "Ancilla-free implementation of generalized measurements for qubits embedded in a qudit space," https://arxiv.org/abs/2203.07369, Phys. Rev. Research 4, 033027 (2022), Mar. 14, 2022, 19 pages, Grace Period Disclosure.

Garcia-Perez et al., "Learning to measure: adaptive informationally complete generalized measurements for quantum algorithms," https://arxiv.org/abs/2104.00569, Dec. 3, 2021, 18 pgs.

Kandala et al, "Hardware-efficient variational quantum eigensolver for small molecules and quantum magnets," Nature 549.7671 (2017): 242-246, https://doi.org/10.1038/nature23879.

Maciejewski et al, "Mitigation of readout noise in near-term quantum devices by classical post-processing based on detector tomography," Quantum 4 (2020): 257, https://quantum-journal.org/papers/q-2020-04-24-257/, Mar. 25, 2020, 23 pgs.

Miller et al., "Measuring a N-Dimensional Quantum System," Application No. 20220100780, filed Sep. 23, 2022.

Wecker et al., "Progress towards practical quantum variational algorithms," Physical Review A 92.4 (2015): 042303, https://doi.org/10.1103/PhysRevA.92.042303, Sep. 8, 2015, 11 pgs.

Wernsdorfer et al., "Synthetic Hilbert Space Engineering of Molecular Qudits: Isotopologue Chemistry," https://onlinelibrary.wiley.com/doi/full/10.1002/adma.201806687, Progress Report, Quantum Computing, Adv. Mater. 2019, 31, 1806687, 11 pgs.

* cited by examiner

---

Figure 5:
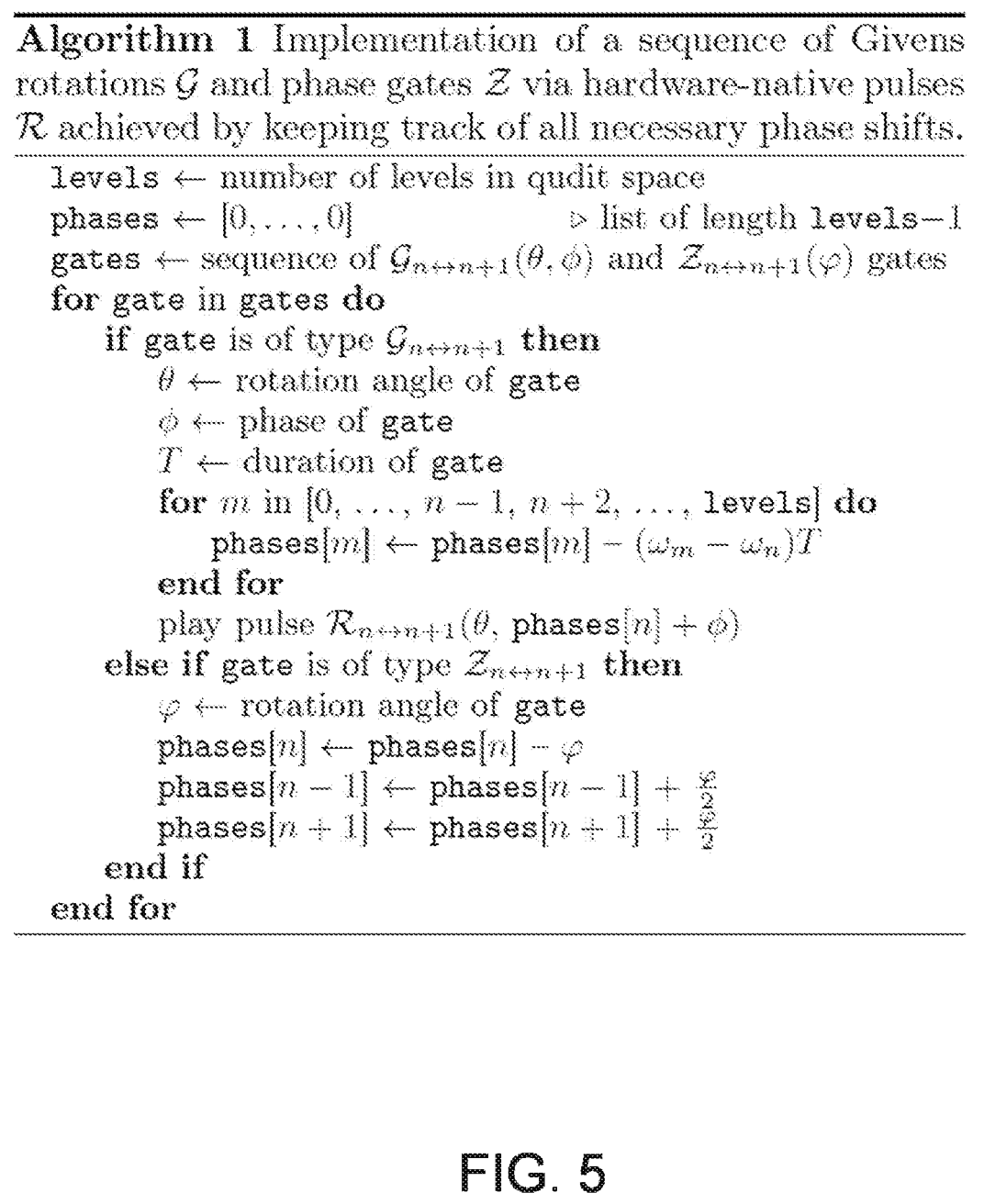

Algorithm 1 Implementation of a sequence of Givens rotations $\mathcal{G}$ and phase gates $\mathcal{Z}$ via hardware-native pulses $\mathcal{R}$ achieved by keeping track of all necessary phase shifts.

--- levels ← number of levels in qudit space
    phases ← [0, . . . , 0]                    ▷ list of length levels−1
    gates ← sequence of $\mathcal{G}_{n\leftrightarrow n+1}(\theta, \phi)$ and $\mathcal{Z}_{n\leftrightarrow n+1}(\varphi)$ gates
    for gate in gates do
        if gate is of type $\mathcal{G}_{n\leftrightarrow n+1}$ then
            $\theta$ ← rotation angle of gate
            $\phi$ ← phase of gate
            $T$ ← duration of gate
            for $m$ in $[0, \ldots, n-1, n+2, \ldots, \text{levels}]$ do
                phases[$m$] ← phases[$m$] − $(\omega_m - \omega_n)T$
            end for
            play pulse $\mathcal{R}_{n\leftrightarrow n+1}(\theta, \text{phases}[n] + \phi)$
        else if gate is of type $\mathcal{Z}_{n\leftrightarrow n+1}$ then
            $\varphi$ ← rotation angle of gate
            phases[$n$] ← phases[$n$] − $\varphi$
            phases[$n-1$] ← phases[$n-1$] + $\frac{\varphi}{2}$
            phases[$n+1$] ← phases[$n+1$] + $\frac{\varphi}{2}$
        end if
    end for

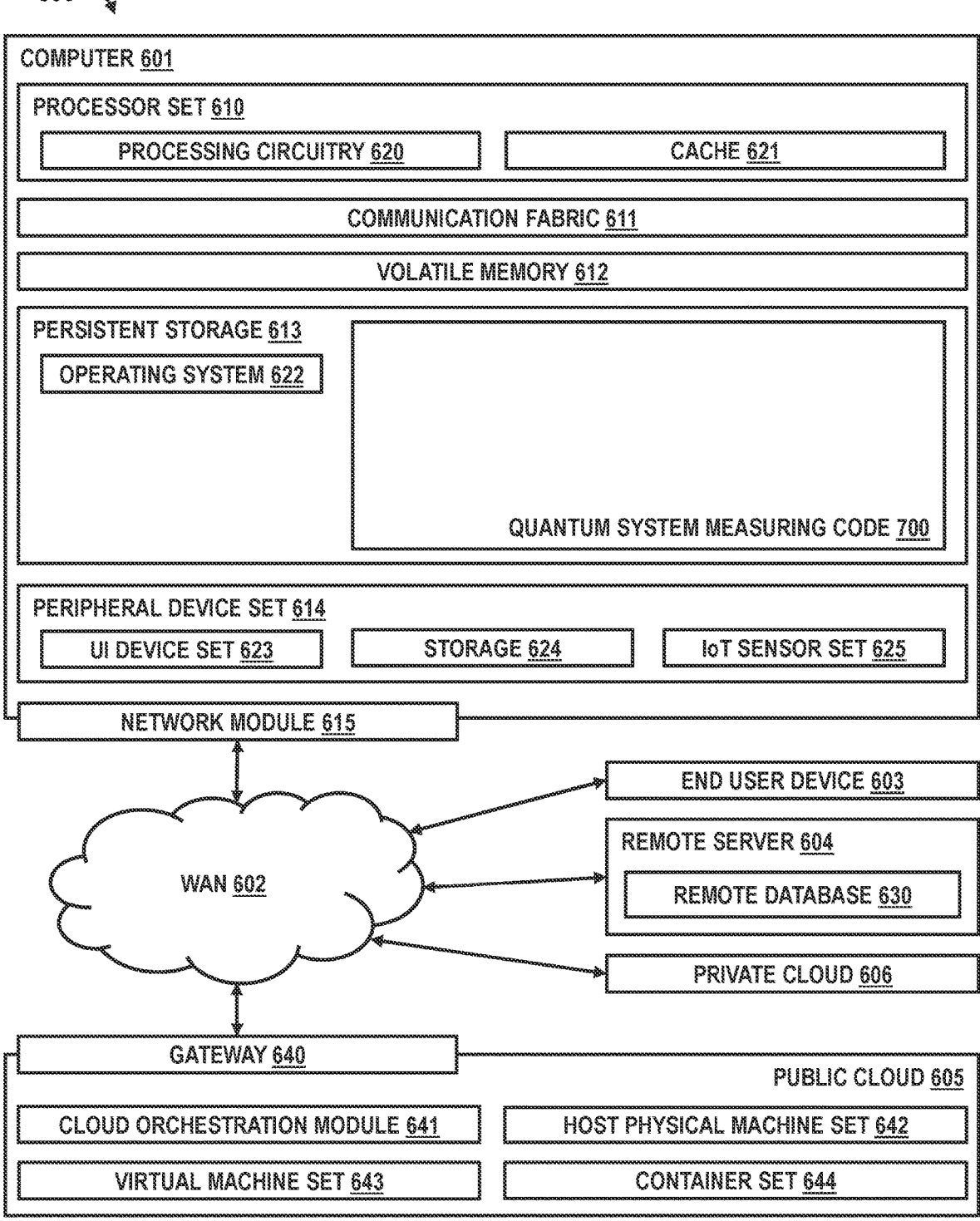

COMPUTER 601

PROCESSOR SET 610

PROCESSING CIRCUITRY 620          CACHE 621

COMMUNICATION FABRIC 611

VOLATILE MEMORY 612

PERSISTENT STORAGE 613

OPERATING SYSTEM 622

QUANTUM SYSTEM MEASURING CODE 700

PERIPHERAL DEVICE SET 614

UI DEVICE SET 623          STORAGE 624          IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641          HOST PHYSICAL MACHINE SET 642

VIRTUAL MACHINE SET 643          CONTAINER SET 644

*FIG. 6*

MEASURING A N-DIMENSIONAL QUANTUM SYSTEM

BACKGROUND

The present disclosure relates to the field of digital computer systems, and more specifically, to a method for measuring an N-dimensional quantum system.

Continual steady progress in the field of quantum technology, attested by continuing improvements in both quantum algorithms and hardware performance, suggests that quantum computers may soon provide significant advantages over their classical counterparts in fields such as optimization, machine learning, finance, quantum physics and chemistry. In particular, ab initio computational studies of molecular systems and materials represent natural areas of application for quantum computers. These prospects have also attracted interest from the material and drug design industries.

SUMMARY

Various embodiments provide a method for measuring an N-dimensional quantum system, computer program product and system as described by the subject matter described herein. Advantageous embodiments are described herein. Embodiments of the present disclosure can be freely combined with each other if they are not mutually exclusive.

In one aspect, the disclosure relates to a method for measuring a first N-dimensional quantum system in a given state $\rho_S$ using a positive-operator valued measure (POVM) measurement, the POVM measurement being defined by M measurement operators. The method includes writing the M eigenstates of the POVM measurement in a chosen computational basis of the first quantum system, thereby defining a M×N matrix whose rows are determined by the respective POVM eigenstates. The method further includes determining a second M-dimensional quantum system into which the first quantum system is embedded. The method further includes determining an initial state $\rho_{ini}$ of the second quantum system which is restricted to the given state $\rho_S$ in the first quantum system. The method further includes extending the M×N matrix by adding M−N columns to the M×N matrix such that the resulting M×M matrix U is unitary. The method further includes applying a decomposition scheme on the unitary matrix U to enable an experimental realisation of the unitary matrix U based on the decomposition. The method further includes transforming the initial state $\rho_{ini}$ to a state $\mu_{ext}$ of the second quantum system by applying to the initial state $\rho_{ini}$ the M×M matrix U according to the decomposition scheme. The method further includes measuring the second quantum system in its state $\rho_{ext}$ using a projection-valued measure (PVM) in a basis of the second quantum system, thereby determining the probability of the occurrence of an outcome m of the M outcomes of the projective measurement as the probability of the occurrence of the outcome m of the M outcomes of the POVM measurement.

In one aspect the disclosure relates to a computer program product comprising a computer readable storage medium having computer readable program code embodied therewith, the computer readable program code configured to implement the method described above.

In one aspect the disclosure relates to a quantum system of dimension M comprising a transmon device, the transmon device being in an initial state $\rho_{ini}$ which is restricted to a state $\rho_S$ of a N-dimensional quantum system embedded in the quantum system, where N<M. The transmon device is configured to receive a sequence of pulses for transforming the initial state $\rho_{ini}$ to a state $\rho_{ext}$ of the quantum system. The transmon device is connected to a readout resonator that is configured to perform a projection-valued measure (PVM) measurement of the transmon device in its state $\rho_{ext}$.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 5 depicts a pseudocode algorithm for implementing a sequence of pulses, in accordance with embodiments of the present disclosure.

FIG. 6 depicts an example computing environment, in accordance with embodiments of the present disclosure.

DETAILED DESCRIPTION

Figure 1:
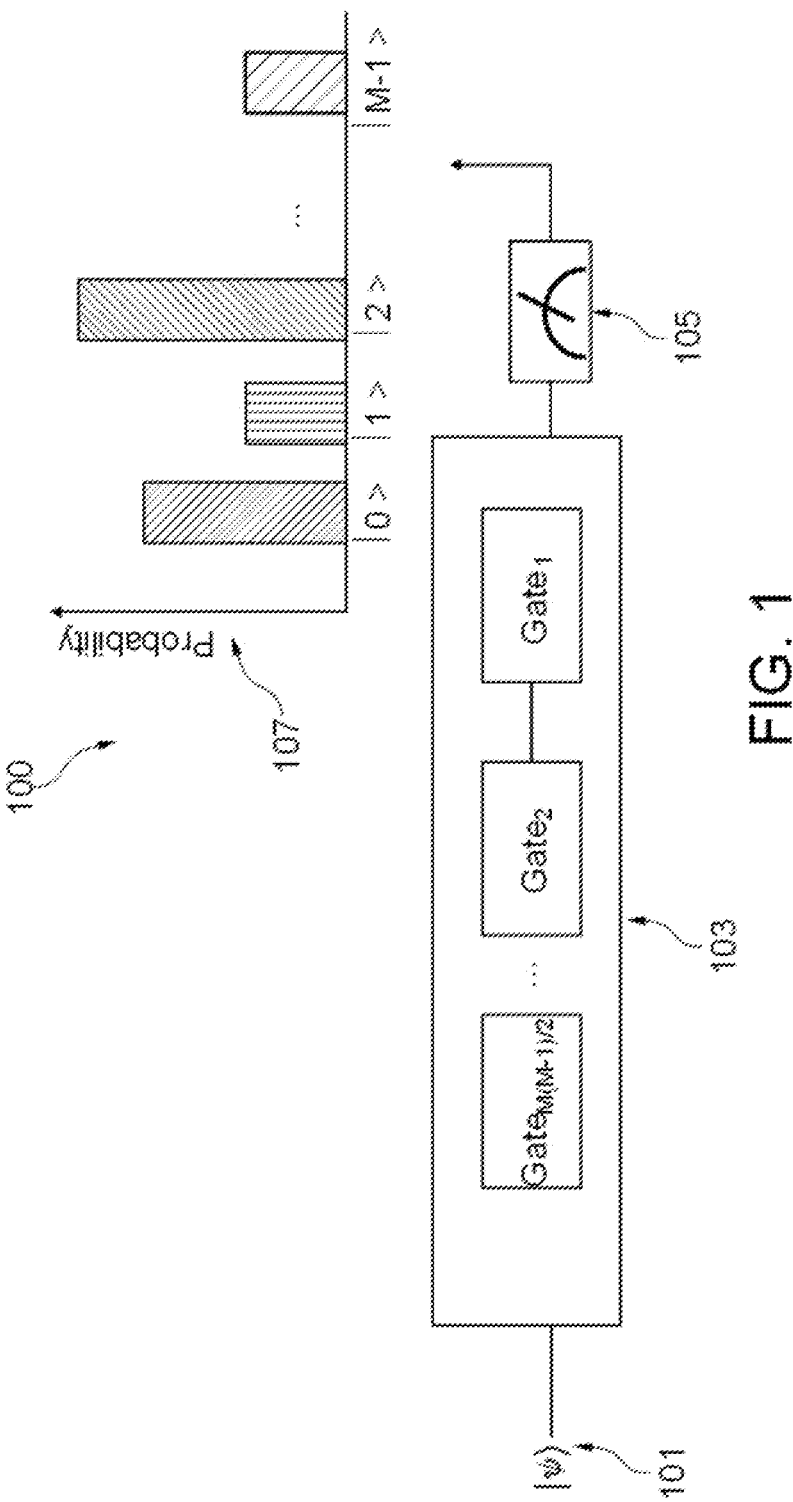
FIG. 1 illustrates a diagram of a quantum computing system, in accordance with embodiments of the present disclosure.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The positive-operator valued measure (POVM) measurement may be advantageous compared to a standard measurement due to the fact that POVM elements are not restricted to be orthogonal and thus their number can exceed the dimension of the system's Hilbert space. For example, a first N-dimensional quantum system may be measured using M measurement operators $\Pi^0, \ldots, \Pi^{M-1}$ of a POVM measurement which satisfy the completeness relation $$\sum_{m=0}^{M-1} \Pi^m$$

wherein the number M is higher than the dimension N of the first quantum system. Each operator $\Pi^m$ may represent one possible outcome of the measurement that occurs with a probability: $p_m = \text{Tr}(\rho_s \Pi^m)$, where $\rho_S$ is a state of the first quantum system and Tr( ) is the trace operator. However, the experimental realization of the POVM measurement may be a challenging task.

The present subject matter may solve this issue by embedding the first N-dimensional quantum system in a larger second M-dimensional quantum system. The first N-dimensional quantum system may be referred to as the first quantum system. The second M-dimensional quantum system may be referred to as the second quantum system. Embedding the first N-dimensional quantum system in the second M-dimensional quantum system may be advantageous because states of the first N-dimensional quantum system may be encoded in the basis of the second quantum system while still representing the first quantum system. This may enable realization of the generalized measurement as a projective measurement in the higher-dimensional space. For example, the initial state $\rho_{ini}$ of the second quantum system may be obtained by encoding the state $\rho_S$ of the first quantum system in a basis of the second quantum system, wherein the initial state has only support in the basis that corresponds to the first quantum system. This embedding may, for example, be advantageous if the basis states of the first quantum system are energy levels of an atom, and the extra basis states are other energy levels of that same atom. The present subject matter may, for example, enable an ancilla-free implementation of generalized measurements for qubits embedded in a qudit space. In other words, the present subject matter may avoid the need for any ancilla qubits.

The present subject matter may further be advantageous as it may enable measurement of the expectation value of a non-diagonal observable (e.g., a molecular Hamiltonian) using a smaller number of quantum circuit executions (shots). The reduction of the number of shots in certain quantum algorithms may lead to significant savings in their execution time. In particular, this may free up the hardware bandwidth to execute more relevant computations per unit of time. For example, a suitable POVM measurement scheme can reduce the required number of shots, and thus algorithm execution time, by one order of magnitude. Thus, with the present measurement scheme, one gains the advantages of a POVM-based readout mechanism, e.g., less shots needed for the measurement of observables, while avoiding the drawbacks of existing schemes that rely on coupling to additional qubits.

The present subject matter may be seamlessly integrated into existing systems. Indeed, the method described herein may leverage the additional quantum states of the hardware in which the qubits are encoded for performing the POVM measurement in a qudit space. Such additional states may be readily available in many of the currently pursued quantum hardware architectures. The present method may be therefore applicable to many architectures such as superconducting qubits, trapped ions, neutral atoms, photons, nitrogen-vacancy (NV) centers, and spin qubits. This may make POVM measurements available to large-scale applications in a variety of quantum hardware, which may have been previously infeasible due to the often limited connectivity of quantum devices.

To realize POVM measurements using the provided second quantum system, a specific unitary matrix U may be applied to achieve a desired evolution of the second quantum system. In particular, the unitary matrix U may be applied to the initial state $\rho_{ini}$ of the second quantum system such that the probability distribution of a subsequent M-outcome projective measurement on the second quantum system coincides with the POVM outcome distribution $\{\rho_m\}$ for the original state $\rho_S$. The probability $p_m$ of the outcome m of the measurement may be defined as follows:

$p_m = \langle m|U\rho_{ini}U^\dagger|m\rangle$.

This indicates that the POVM measurement may be performed by applying the unitary matrix U in order to extend the first quantum system to the second quantum system and by performing a projective measurement in the M-dimensional space. The existence of the unitary matrix U may be guaranteed by Naimark's dilation theorem.

The unitary matrix U may be obtained as follows. The M eigenstates $|\psi_m\rangle$ of the POVM measurement may be written in a chosen basis of the first quantum system as follows:

$$\left|\Psi_m\right> = \sum_{j=0}^{N-1} a_{mj}\left|j\right>, \text{ where } \{|j>\}$$

may be any one of orthonormal basis states of the first quantum system. The completeness relation may thus be written as $$\sum_{m=0}^{M-1}|\Psi_m> \; <\Psi_m| = \sum_{m=0}^{M-1}\sum_{j,k=0}^{N-1} a_{mj}|j> \; <k|a_{mk}^* = 1$$

where the coefficients $a_{mj}$ also noted as $a_{m,j}$ may be arranged in a M×N matrix as follows:

$$\begin{pmatrix} a_{0,0}^* & \cdots & a_{0,N-1}^* \\ \vdots & \ddots & \vdots \\ a_{M-1,0}^* & \cdots & a_{M-1,N-1}^* \end{pmatrix}$$

such that the M columns correspond to to the complex conjugates of the different eigenstates $|\psi_m\rangle$. The columns of this matrix may be orthonormal and thus may be completed to become the unitary matrix U by adding M−N suitably chosen columns. According to embodiment, adding the M−N columns is performed using a Gram-Schmidt procedure.

After being determined, the present subject matter may use a decomposition scheme to decompose the unitary matrix U so that the unitary matrix may be efficiently implemented in an experimental realization. For example, the decomposition scheme may be applied such that the unitary matrix U is implementable by external control pulses, wherein the control pulses are implemented by microwave or laser pulses. For that, the unitary matrix U may be decomposed into a sequence of matrices in accordance with the decomposition scheme. The decomposition of the unitary matrix may, for example, enable mapping of the quantum algorithm to a set of gates which may be implemented by external pulses. The sequence of matrices may, for example, be Givens rotation matrices. An efficient implementation of this decomposition may allow for the translation of a bigger unitary gate associated with the unitary matrix U into elementary quantum operations, which may be key to executing these algorithms on existing quantum computers.

In one example, the decomposition of the unitary matrix may be performed so that the multiplication of the unitary matrix U from the right with a sequence of matrices $V_{rc}$ may result into a diagonal matrix. For that, starting with the last row of the unitary matrix U, taking r=M−1 and c=M−1, M−2, . . . 0, the elements $a_{M-1, M-2}$, $a_{M-1, M-3}$, . . . . , $a_{M-1,0}$ may be successively set to zero. This may result in the following matrix:

$$U \cdot V_{M-1,M-2} \cdot V_{M-1,M-3} \ldots V_{M-1,0} = \begin{pmatrix} & & & 0 \\ & & & 0 \\ & & & \vdots \\ & & & 0 \\ \hline 0 & 0 & \ldots & 0 & e^{i\gamma p} \end{pmatrix}.$$

This process may be repeated for subsequent rows until the unitary matrix U has been transformed into a diagonal matrix $\Theta$ as follows: $U.V_{M-1, M-2} \cdot V_{M-1, M-3} \cdots V_{1,0} = \Theta$. The unitary matrix may therefore be written as the following matrix product:

$$U = \Theta V_{1,0}^{\dagger} \ldots V_{M-1,M-3}^{\dagger} V_{M-1,M-2}^{\dagger}.$$

This decomposition may be suitable for different experimental realizations. For example, the matrices $V_{M-1, M-2}$, $V_{M-1, M-3}$ and $V_{1,0}$ may experimentally be implemented using different techniques such as a sequence of control pulses.

According to one embodiment, the decomposition scheme may be performed such that the unitary matrix U may be implementable by control pulses. The unitary matrix may be decomposed into a sequence of simpler physical operations. These operations may be implemented using sequences of microwave or laser pulses, each implementing an evolution operator. This embodiment may enable finding control pulses or sequences of such pulses that are feasible from a practical point of view. For example, the POVM-encoding unitary U may be implemented through a sequence of pulses that couple adjacent levels. This may be suitable to architectures where an external drive with a dipole coupling is available, e.g., through microwave or laser pulses. Therefore, this embodiment may enable achievement of a desired evolution of the system by applying external control fields that are feasible from a practical point of view.

Assuming, for example, that the second quantum system is a multi-level quantum system with a discrete energy spectrum and well-separated, non-degenerate energy levels $E_n$ for $0 \le n \le M-1$. The internal Hamiltonian of the second quantum system may have the following spectral representation:

$$H_0 = \sum_{n=0}^{M-1} E_n |n> <n|$$

where $\{|n>\}$ is a complete set of orthonormal eigenstates corresponding to the energy levels of the second quantum system. In other words, $H_0$ may be the Hamiltonian of the second quantum system in which the POVM measurement may be implemented and that can be decomposed into eigenvalues $E_n$ and the operators $P_n = |n> <n|$. The difference between adjacent energy levels n and n+1 which may be defined as $\omega_n \equiv E_{n+1} - E_n > 0$, is strictly positive for all n, wherein $\omega_m \ne \omega_n$ for $m \ne n$. External control fields may perturb the evolution of the system and give rise to a new Hamiltonian $H = H_0 + H_{int}$, where $H_{int}$ is an interaction term. Each control pulse may be resonant with one transition frequency $\omega_D$. The control pulse may, for example, be provided as follows: $\epsilon(t) = \Omega(t) \cos(\omega_D t - \phi)$, with envelope $\Omega(t)$, drive frequency $\omega_D$ and phase $\phi$. The control may be achieved by adjusting a sequence of such control pulses, the pulse envelopes $\Omega(t)$ and/or possibly the pulse phase $\phi$. The interaction of the second quantum system with the field $\epsilon(t)$, for a transition frequency $\omega_D = \omega_n = E_{n+1} - E_n$, may provide the interaction Hamiltonian:

$$H_{int}(t) = \epsilon(t) \sum_{n=0}^{M-2} g_n |n> <n+1| + h.c.,$$

where $g_n$ denotes the coupling strength to the transition $n \leftrightarrow n+1$. By transforming into a rotating frame (rf) of the drive, and applying the rotating wave approximation (dropping terms rotating at $2\omega_D$), these Hamiltonians become:

$$H_0^{rf} = \sum_{n=0}^{M-1} (E_n - n\omega_D) |n> <n|$$

and $$H_{int}^{rf}(t) = \frac{\Omega(t)}{2} \sum_{n=0}^{M-2} g_n e^{i\phi} |n+1><n| + h.c.$$

According to one embodiment, the decomposition scheme may be performed such that the unitary matrix U may be decomposed into a sequence of rotation matrices, wherein the sequence of rotation matrices is provided such that the application of their inverse to the M×M unitary matrix U in reverse order results in a diagonal matrix.

Following the above example, evolving the Hamiltonian $$H_0^{rf} + H_{int}^{rf}(t)$$

for a duration T may result in the qudit unitary: $\mathcal{Z}_{n \leftrightarrow n+1}(\theta, \phi) = G_{n \leftrightarrow n+1}(\theta, \phi) \times diag(e^{-iE_0 T}, \ldots, e^{-i(E_{M-1}-(M-1)\omega_D)T})$, where $G_{n \leftrightarrow n+1}(\theta, \phi)$ is an operator that applies a Givens rotation $$G(\theta, \phi) = \begin{pmatrix} \cos\left(\frac{\theta}{2}\right) & -i\sin\left(\frac{\theta}{2}\right)e^{-i\phi} \\ -i\sin\left(\frac{\theta}{2}\right)e^{i\phi} & \cos\left(\frac{\theta}{2}\right) \end{pmatrix}$$

between levels n and n+1, $\theta$ is a rotation angle, and diag is a diagonal matrix that imprints phases on all non-resonant states. The unitary matrix may be defined as a function of these qudit unitaries so that consecutive Givens rotations introduce an additional zero below the diagonal of the unitary matrix, where the number of elements below the diagonal is $M(M-1)/2$. The unitary matrix may thus be written as a sequence of these population transfers between two levels from the second quantum system as follows:

$$U = \Theta \left[ \prod_{l=1}^{M(M-1)/2} \mathcal{R}_{n_l \leftrightarrow n_{l+1}}(\theta_l, \phi_l) \right]$$

where $\Theta$ is a set of phase factors in a diagonal matrix, $n_l$ is an index that can have any value between 0 and n. The specific choice of the targeted POVM operators $\Pi^m$ enter through the angles $\theta_l$ and $\phi_l$, while the order in which the transitions are driven may be fixed and may be independent of the POVM.

According to one embodiment, the sequence of rotation matrices is provided such that the application of their inverse to the M×M unitary matrix U in reverse order results in the identity matrix, wherein the sequence of rotations comprises a first type of rotation and a second type of rotation; wherein the first type of rotation is a rotation around a given axis with a rotation angle and with a polar angle, and the second type of rotation is a rotation applying a relative phase.

The first type of rotations may be the rotations $\mathcal{R}_{n \Leftrightarrow n+1}(\theta, \phi)$ defined above. The second type of rotations may further define generalized $\mathcal{Z}_{n \Leftrightarrow n+1}(\varphi)$-rotations that act as diag $$\mathrm{diag}\left(e^{-i\frac{\varphi}{2}}, e^{i\frac{\varphi}{2}}\right)$$

on the states |n> and |n+1> and as the identity elsewhere. The second type of rotations may enable fully decomposing the unitary U (including all relative phases) without increasing the number of pulses. This type of rotations may be advantageous as it may use the same sequence of pulses defined above for implementing them. Indeed, these $\mathcal{Z}$-rotations may be implemented by adjusting the phases $\phi$ of subsequent drive pulses, e.g., the $\mathcal{Z}$-rotation may be implemented by a respective $\mathcal{Z}$-gate. The $\mathcal{Z}_{n \leftrightarrow n+1}(\varphi)$ gates may, for example, be "virtually" implemented by adding $\varphi/2$ to all subsequent pulses in the n+1↔n+2 and n−1↔n frames while deducting a phase $\varphi$ from the following pulses in the n↔n+1 frame. For example, in case M=4, each pulse as defined in the following equation $\varepsilon(t)=\Omega(t)\cos(\omega_D t-\phi)$ may be played in a frame that consists of a carrier frequency $\omega_D$ and a phase $\phi$. For an implementation of the qudit-space unitary, three frames may be relevant, which correspond to the three driven transitions, i.e., 0↔1, 1↔2 and 2↔3. While the frequencies of the drives in these frames may always remain fixed to the transition energies of the system such that $\omega_n=E_{n+1}-E_n$, the phases of the frames may need to be adjusted to account for phase advances during $\mathcal{R}$-rotations and to virtually implement $\mathcal{Z}$-gates. As an example of a $\mathcal{Z}$-rotation in qudit space, the following $\mathcal{Z}$-gate:

$$z_{1 \leftrightarrow 2}(\varphi) = \begin{pmatrix} 1 & 0 & 0 & 0 \\ 0 & e^{-i\frac{\varphi}{2}} & 0 & 0 \\ 0 & 0 & e^{i\frac{\varphi}{2}} & 0 \\ 0 & 0 & 0 & 1 \end{pmatrix}$$

may apply a relative phase of $-\varphi$ between states |1> and |2>. Therefore, an angle $\varphi$ may need to be subtracted from the phase of all subsequent pulses played in the 1↔2 frame. However, while the above gate leaves the levels |0> and |3> unchanged, it applies a relative phase of $\varphi/2$ between the levels |0> and |1>, as well as between |2> and |3>. Hence, in addition to affecting all following phases in the 1↔2 frame, an angle $\varphi/2$ may be added to all drive phases in the 0↔1 and 2↔3 frames.

According to one embodiment, the application of the sequence of rotations is implemented using sequences of microwave or laser pulses, wherein the first type of rotations is implemented by microwave or laser pulses and the second type of rotations is implemented by a phase shift of all subsequent pulses.

According to an embodiment, the first quantum system is a qubit system, and the second quantum system is a qudit system. In one example, N=2 and M=4.

According to an embodiment, the number of measurement operators is four, M=4. In this case, the unitary matrix can be realized as a sequence of six $\mathcal{R}$-rotations, where 6=M(M−1)/2. However, the number of rotations may be reduced in accordance with the present subject matter by initially introducing zero(s) in the non-diagonal elements of the unitary matrix at the time of building the unitary matrix. This is possible as there may be a freedom in choosing the additional M−N columns of the unitary matrix U. For example, by setting the element U(0,3) to zero (i.e., U(0,3)=0), the sequence may be reduced to a sequence of 5 rotations as follows: $U=\mathcal{R}_{1 \Leftrightarrow 2}(\theta_5, \phi_5)\mathcal{R}_{2 \Leftrightarrow 3}(\theta_4, \phi_4)\mathcal{R}_{0 \Leftrightarrow 1}(\theta_3, \phi_3)\mathcal{R}_{1 \Leftrightarrow 2}(\theta_2, \phi_2)\mathcal{R}_{0 \Leftrightarrow 1}(\theta_1 \phi_1)$. Any $\mathcal{R}$-rotation may be realized by two $\sqrt{\overline{\chi}}$-pulses and three virtual $\mathcal{Z}$-gates, where $\sqrt{\overline{\chi}}_{n \leftrightarrow n+1}$ denotes a $\pi/2$-pulse around the x-axis between the states |n> and |n+1>. This may have the practical benefit that only the three pulses $\sqrt{\overline{\chi}}_{0 \leftrightarrow 1}$, $\sqrt{\overline{\chi}}_{1 \leftrightarrow 2}$, and $\sqrt{\overline{\chi}}_{2 \leftrightarrow 3}$, rather than a parametrized family of pulses, require calibration. It may thus be helpful to decompose the above pulse sequence of 5 rotations into $\sqrt{\overline{\chi}}$-gates, shifting all angular dependencies into near-perfect virtual $\mathcal{Z}$-gates. Common calibration techniques applicable to the qudit-space pulses may readily be available. The resulting pulse sequence for the implementation of the unitary matrix U may thus require a total of ten $\sqrt{\overline{\chi}}$-pulses.

According to an embodiment, the method further comprises resetting the second system to the state $\rho_{ini}$ after the measuring step.

According to an embodiment, the states $\rho_{ini}$ and $\rho_{ext}$ are mixed states or pure states.

According to an embodiment, the POVM measurement is an informationally complete (IC) POVM measurement. Hence, the present subject matter may enable a measurement scheme for IC-POVMs which does not require ancilla qubits. A POVM measurement may be informationally complete if every Hermitian operator or observable $\mathcal{O}$ may be written or decomposed as follows: $\mathcal{O} = \Sigma_m c_m \Pi^m$, where $c_m \in \mathbb{R}$. The probability distribution $\{p_m\}$ may suffice to computer the expectation value of the observable $\mathcal{O}$ as follows: $\langle \mathcal{O} \rangle = \mathrm{Tr}(\rho_S \mathcal{O}) = \Sigma_m c_m p_m$. The expectation value may, for example, be estimated from $\mathcal{N}$ samples drawn from the POVM outcome distribution as $\langle \mathcal{O} \rangle = \Sigma_m c_m \mathcal{N}_m / \mathcal{N}$ where $\mathcal{N}_m$ denotes the number of times outcome m was observed. The error on this estimator may be the standard error of the mean as follows:

$$\epsilon^2\left(\langle \mathcal{O} \rangle\right) = \frac{\mathrm{VAR}(O)}{\mathcal{N}} = \left(\sum_m c_m^2 p_m - \langle O \rangle^2\right)/\mathcal{N},$$

where VAR(•) is the variance.

According to one embodiment, the POVM measurement is a hardware implemented POVM measurement. The method further comprises: correcting a bias in the POVM measurement. The correction comprises: estimating, using quantum detector tomography, the M operators implemented by the hardware-implemented POVM measurement; and correcting, using the estimated hardware-implemented POVM operators, the measured expectation value of the observable $\mathcal{O}$. This may, for example, be performed by recomputing the decomposition of the observable $\mathcal{O}$ for the estimated POVM operators and correcting the measured expectation value e.g., by subtracting from the measured expectation value its difference with the expected value of the re-decomposed observable.

Indeed, the experimental realization may be limited by misassignment errors in the readout due to insufficient separation in the IQ-plane. Also, even with perfect readout fidelities, the considerable charge noise of transmon devices may still raise the question whether qudit POVMs with operational distances (ODs) of ~0.1 are sufficient for practical applications. The operational distance may be a measure of distance between quantum measurements. The operational distance between arbitrary POVMs $\Pi$ and $\Sigma$ may be defined as follows:

$$OD(\Pi, \Sigma) = \max_{I' \subset I} \left\| \sum_{m \in I'} \left( \prod^m - \sum^m \right) \right\|_\infty,$$

where I is the set of all outcomes I={0, . . . , M−1} and $\|\cdot\|_\infty$ denotes operator norm. The operator norm may be defined for an operator A acting on the vector space V as follows: $\|A\|_\infty = \sup_V \{ \|Av\|_\infty : v \in V, \|v\|_\infty = 1 \}$. The optimized (theoretical) target POVM may be denoted by $\Pi_{theo}$, which defines a target unitary in the qudit space of each transmon with corresponding outcome probabilities $$p_m^{theo}$$

according to the equation:

$$Tr\left( \rho_S \prod^m_{theo} \right).$$

However, due to device noise, the effective (experimental) channel that is applied to the qudits may encode a different POVM, denoted by $\Pi_{exp}$, which may slightly deviate from the theoretical one. In practice, $\Pi_{exp}$ defines the experimental measurement probabilities of the outcomes $$p_m^{exp}$$

while $\Pi_{theo}$ is used to obtain the decomposition of observable O with coefficients $$c_m^{theo}$$

as defined in the equation:

$$O = \sum_m c_m^{theo} \prod^m_{theo}.$$

The combined estimator converges to $$\langle \widetilde{O} \rangle = \sum_m c_m^{theo} p_m^{exp}$$

which differs from the theoretical expectation value due to the imperfections in the device, leading to a bias $$\sum_m c_m^{theo} \left( p_m^{exp} - p_m^{theo} \right).$$

For example, to estimate the impact of this bias on practical applications, one may study its effects on energy measurements of trained Variational Quantum Eigensolver (VQE) ansatz states for small molecular Hamiltonians mapped onto four to eight qubits. POVMs that minimize the variance for the respective Hamiltonians over the trial states may be used as the target operators $\Pi_{theo}$. These POVMs may be simulated under charge noise for a transmon device with $E_J/E_C$=45. In most cases, the charge noise may create biases that prevent energy estimations down to chemical accuracy.

To attenuate the large biases induced by the hardware noise, an efficient error mitigation strategy in which the mismatch between $\Pi_{theo}$ and $\Pi_{exp}$ is reduced by means of quantum detector tomography may be applied. This process may allow an accurate estimation of the POVM operators that are actually implemented in the device, denoted by $\Pi_{tomo}$. With this procedure, the decomposition of the observable $O$ into the operators of $\Pi_{tomo}$ is computed, i.e., $$O = \sum_m c_m^{tomo} \prod^m_{tomo}$$

O, and then the new coefficients $$c_m^{tomo}$$

may be used to estimate the expectation value as $$\langle \widetilde{O} \rangle = \sum_m c_m^{tomo} p_m^{exp}.$$

With an increasing number of tomography shots, the OD between $\Pi_{exp}$ and $\Pi_{tomo}$ can be arbitrarily decreased. In turn, the systematic bias $$\sum_m c_m^{theo} \left( p_m^{exp} - p_m^{tomo} \right)$$

may converge to zero for an infinite number of tomography shots. The desired accuracy in a given application thus defines how many measurements should be dedicated to the detector tomography. Since the considered POVMs may always be products of single-qubit POVMs, the tomographic reconstruction may be carried out on all qubits in parallel. Thus, the overhead in the shot budget may be constant, and this process may not hamper the scalability of qudit based POVMs. Even for current transmon hardware with $E_J/E_C$=45, quditspace POVM measurements characterized through detector tomography may be sufficiently accurate for quantum chemistry applications.

FIG. 1 illustrates a diagram of a quantum computing system in accordance with an example of the present disclosure.

The quantum computing system 100 may represent a quantum circuit. The quantum computing system 100 comprises a unitary transformation unit 103 and a qudit measurement unit 105. The unitary transformation unit 103 comprises a sequence of M(M−1)/2 gates for transforming an initial qudit state |ψ>101 to an evolved qudit state. The sequence of gates may implement a decomposed M×M matrix U=

$$\Theta V_{1,0}^{\dagger} \;\; \dots \;\; V_{M-1,M-3}^{\dagger} V_{M-1,M-2}^{\dagger},$$

where $\Theta$ is a set of phase factors in a diagonal matrix, $n_l$ is an index that can have any value between 0 and n. The second quantum system may be measured in its state $\rho_{ext}$ using a projective measurement by the measurement unit 105. This may result in a probability distribution 107 of the M basis states of the qudit system.

Figure 2:
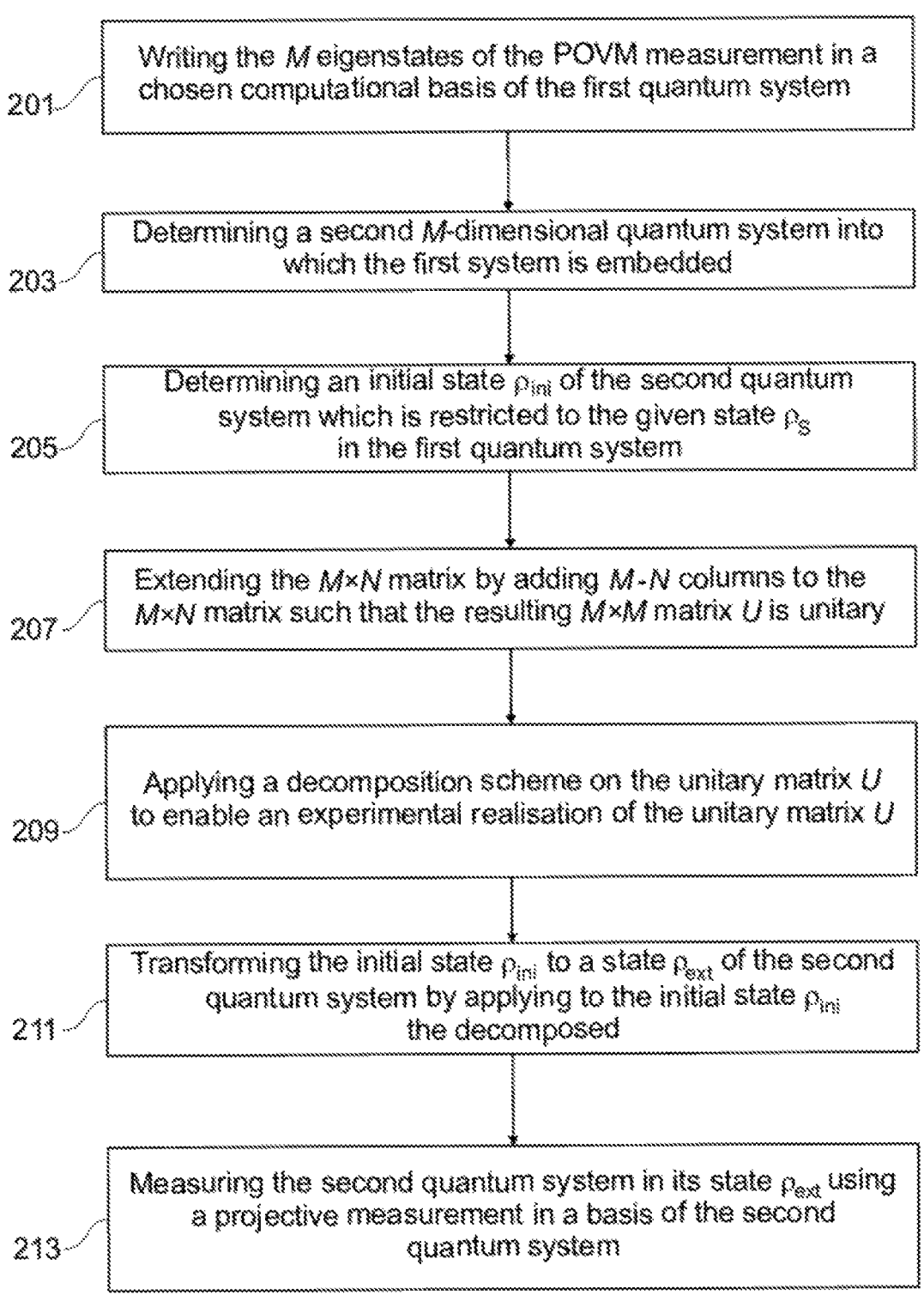
FIG. 2 is a flowchart of a method for measuring a N-dimensional quantum system, in accordance with embodiments of the present disclosure.

FIG. 2 is a flowchart of a method for measuring a N-dimensional quantum system (named first quantum system) in accordance with an example of the present disclosure. The first quantum system may be in a given state $\rho_S$.

The M eigenstates of the POVM measurement may be written at operation 201 in a chosen computational basis of the first quantum system. This may define a M×N matrix whose rows are determined by the respective POVM eigenstates. Indeed, the M eigenstates $|\Psi_m\rangle$ of the POVM measurement may be written in the chosen basis of the first quantum system as follows:

$$\left|\Psi_m\right\rangle = \sum_{j=0}^{N-1} a_{mj}\left|j\right\rangle, \text{ where } \{|j\rangle\}$$

may be any one of orthonormal basis states of the first quantum system. The completeness relation may thus be written as $$\sum_{m=0}^{M-1} |\Psi_m\rangle < \Psi_m| = \sum_{m=0}^{M-1}\sum_{j,k=0}^{N-1} a_{mj}|j\rangle < k|a_{mk}^* = 1,$$

where the coefficients $a_{mj}$ may be arranged in the M×N matrix as follows:

$$\begin{pmatrix} a_{0,0}^* & \cdots & a_{0,N-1}^* \\ \vdots & \ddots & \vdots \\ a_{M-1,0}^* & \cdots & a_{M-1,N-1}^* \end{pmatrix}$$

such that the M columns correspond to the complex conjugates of the different eigenstates $|\psi_m\rangle$. A second M-dimensional quantum system into which the first quantum system is embedded may be determined at operation 203. For example, in case the basis states of the first quantum system are energy levels of an atom, extra basis states representing other energy levels of that same atom may be provided for the second quantum system.

An initial state $\rho_{ini}$ of the second quantum system which is restricted to the given state $\rho_S$ in the first quantum system may be determined at operation 205. For example, the initial state $\rho_{ini}$ may be provided by its restriction $\rho_s$ to the first quantum system.

The M×N matrix may be extended at operation 207 by adding M−N columns to the M×N matrix such that the resulting M×M matrix U is unitary. This may, for example, be performed using the Gram-Schmidt procedure.

A decomposition scheme may be applied at operation 209 on the unitary matrix U to enable an experimental realization of the unitary matrix U.

The initial state $\rho_{ini}$ may be transformed at operation 211 to a state $\rho_{ext}$ of the second quantum system by applying to the initial state $\rho_{ini}$ the decomposed M×M matrix U according to the decomposition scheme. If, for example, the decomposition scheme defines a sequence of external pulses to implement U, these pulses may be applied at operation 211 in order to transform the initial state $\rho_{ini}$ of the second quantum system.

The second quantum system may be measured at operation 213 in its state $\rho_{ext}$ using a projective measurement in a basis of the second quantum system. This may determine the probability of the occurrence of an outcome m of the M outcomes of the projective measurement which is equal to the probability of the occurrence of the outcome m of the M outcomes of the POVM measurement.

Figure 3:
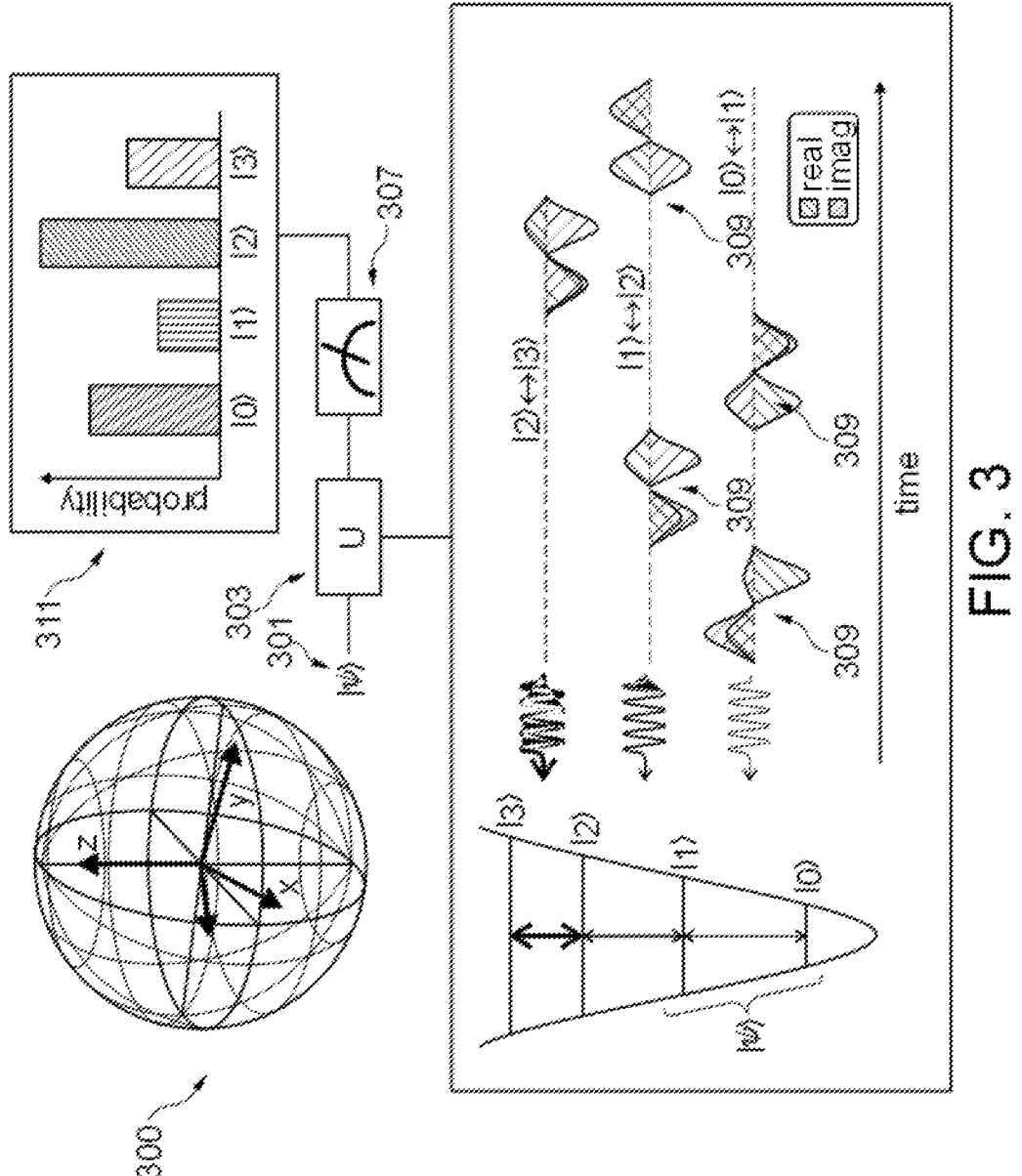
FIG. 3 illustrates a diagram of a schematic of a POVM implementation in qudit space, in accordance with embodiments of the present disclosure.

FIG. 3 illustrates a diagram of a schematic of a POVM implementation in qudit space in accordance with an example of the present disclosure.

As shown in FIG. 3, the M=4 rank-one, single-qubit POVM operators, which are represented on a Bloch sphere 300, may define a four-dimensional unitary U 303 which encodes the POVM operators. This unitary U 303 may be realized on the qudit space in which the qubit state $|\psi\rangle$301 is encoded. This may be achieved by a sequence of ten $\pi/2$-pulses 309 that couple adjacent levels, where each pulse is depicted with a Gaussian envelope in FIG. 3. Finally, a projective measurement 307 of the four states ($|0\rangle$, $|1\rangle$, $|2\rangle$ and $|3\rangle$) yields the outcome probabilities 311 of the four POVM operators. Thus, the present disclosure may enable applying a single-qudit unitary on the space ($|0\rangle$, $|1\rangle$, $|2\rangle$, $|3\rangle$) at the end of a quantum circuit to encode the outcome probabilities of the IC POVM into the measurement probabilities of the four qudit states. With full control over this unitary, any (rank-1) IC POVM may be implemented. This may allow tailoring the measured POVM to the observable of interest, minimizing the observable's variance and thus lowering the shot requirements to get an estimate within a given accuracy. This coupling to the qudit space may only be needed for a short, constant-depth gate sequence prior to readout, and the present subject matter may not require any two-qudit gates.

Figure 4:
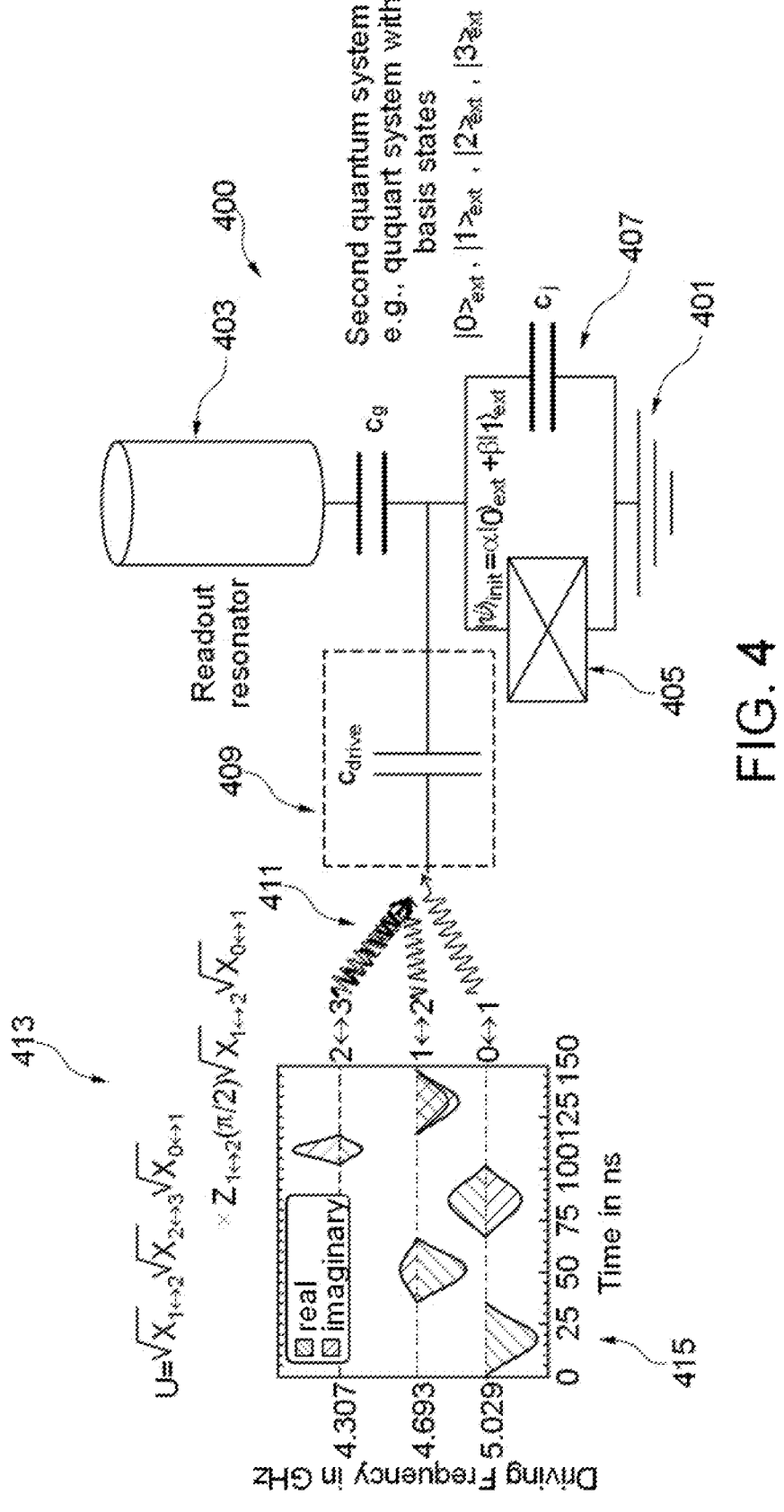
FIG. 4 shows a circuit diagram of an example of a qudit system, in accordance with embodiments of the present disclosure.

FIG. 4 shows a circuit diagram of an example of a qudit system according to an example of the present disclosure. For example, a PVM measurement of the qudit system may provide a POVM measurement of a qubit system embedded in the qudit system.

The qudit system 400 may comprise a single transmon device 401 comprising a josephson junction 405 in parallel with a capacitor 407. The transmon device 401 is capacitively coupled to a readout resonator 403 through a gate capacitor $C_g$. The qudit system 400 comprises a qudit drive line 409 with a capacitor $C_{drive}$. The qudit drive line 409 may be used to modify the state of the transmon device by applying a sequence of microwave drive pulses 411.

For example, the initial state $|\psi\rangle_{init}$ of the qudit system 400 may be restricted to a state of a qubit system e.g., $|\psi\rangle_{init}=\alpha|0\rangle_{ext}+\beta|1\rangle_{ext}+0|2\rangle_{ext} +0|3\rangle_{ext}$, where the two energetically next-highest states $|2\rangle_{ext}$ and $|3\rangle_{ext}$ are provided in addition to the qubit states $|0\rangle_{ext}$ and $|1\rangle_{ext}$. The initial transmon's state may be modified as needed throughout the course of executing a quantum algorithm. The quantum algorithm may for example require application of the sequence of pulses 413 which represents a unitary transformation U such that the initial state of the transmon device 401 may be transformed. Indeed, with the decomposition $U=\sqrt{\chi}_{1\leftrightarrow2}\sqrt{\chi}_{2\leftrightarrow3}\sqrt{\chi}_{0\leftrightarrow1} Z_{1\leftrightarrow2}(\pi/2)\sqrt{\chi}_{1\leftrightarrow2}\sqrt{\chi}_{0\leftrightarrow1}$, there may be only need to drive transitions between adjacent states. Modulations may be applied in a given control hardware to the carrier frequency of up to approximately 1 GHz (still oversampling by a factor of 4.5). The carrier frequencies of 4.7 GHz and 4.3 GHz required to address the $1\leftrightarrow2$ and $2\leftrightarrow3$ transitions, respectively, may thus be well within the capabilities of the control hardware. The decomposition U has a single drive of the $2\leftrightarrow3$ transition. Hence, the $|5>_{ext}$ state may only be populated once during the sequence, so that any phase uncertainty after the $2\leftrightarrow3$ pulse may become irrelevant upon measurement in the qudit basis. Thus, whereas full coherent control of the $|5>_{ext}$ state may be difficult to achieve, the relatively simple pulse sequence required for the POVM measurement may be particularly robust to phase uncertainties of this state.

The pulse sequence 413 is illustrated in plot 415. The non-trivial phases of the pulses, manifested in non-zero imaginary parts, arise from both the $\mathcal{Z}_{1\leftrightarrow2}$-gate in the sequence as well as from phases acquired during frame changes between different transitions. The quantum algorithm may require three distinct drive tones representing three drive frequencies for performing a POVM measurement in the qubit system.

After executing the quantum algorithm, i.e., after applying the sequence of pulses 413, the resulting state of the transmon device 401 may be determined using the readout resonator 403. This may be performed by leveraging that the state of the transmon modifies the resonant frequencies of the readout resonator 403. These changes may be, for example, monitored via microwave spectroscopy. The resulting measurement may be the POVM measurement of the qubit system. Indeed, the transmon device 401 may be dispersively measured by coupling it to the readout resonator such that the transmitted signal is typically down-converted and integrated, resulting in a point in the IQ-plane, which may then be discriminated into the four qudit states.

However, a challenge for qudit control of transmons may be the charge dispersion of higher-excited states. The exact eigenenergies of all transmon states may fluctuate under charge noise of the environment. This effect may increase exponentially for the energetically higher states thereby posing a threat for high-fidelity pulses on the $1\leftrightarrow2$ and especially on the $2\leftrightarrow3$ transition. As a result, transition frequencies may fluctuate considerably from one experimental run to another. To ensure a resonant driving of the transition, the corresponding drive pulses thus may be provided to cover a broad spectral range. This can be achieved by shortening the pulses; however, this may increase phase errors and leakage to neighboring levels. In such instances, application of the pulse shaping techniques such as DRAG and advanced optimal control may alleviate this issue.

FIG. 5 depicts a pseudocode algorithm for implementing a sequence of pulses.

A sequence of gate instructions consisting of Givens rotations $G(\theta_G, \phi_G)$and phase gates $\mathcal{Z}(\varphi\mathcal{Z})$ may be implemented in the qudit space through pulses $\mathcal{R}(\theta\mathcal{R}, \phi\mathcal{R})$ where the rotation angles remain unchanged ( $\theta_{\mathcal{R}}=\theta_G$ ) and the phases of the pulses $\phi_{\mathcal{R}}$ depend on the phases $\phi_G$ and $\varphi_Z$ of all previously implemented gates of the sequence. This procedure is summarized as the pseudocode algorithm of FIG. 5.

For example, while playing a pulse of a total duration T in the $n\leftrightarrow n+1$ frame, the uncoupled levels may acquire non-trivial phases. For example, a drive in the $1\leftrightarrow2$ frame may implement the following unitary $$\mathcal{R}_{1\leftrightarrow2}(\theta, \phi) =$$

$$e^{i(\omega_1-E_1)T} \times \begin{pmatrix} e^{-i(\omega_1-\omega_0)^T} & 0 & 0 & 0 \\ 0 & \cos\left(\frac{\theta}{2}\right) & -i\sin\left(\frac{\theta}{2}\right)e^{-i\phi} & 0 \\ 0 & -i\sin\left(\frac{\theta}{2}\right)e^{i\phi} & \cos\left(\frac{\theta}{2}\right) & 0 \\ 0 & 0 & 0 & e^{-i(\omega_2-\omega_1)^T} \end{pmatrix}$$

Let $\alpha_n=w_n-w_{n-1}$for $n >0$, such that for an anharmonic oscillator, $\alpha_n$ may simply denote the anharmonicity. The above unitary results in a relative phase $\Delta\phi_{0\leftrightarrow1}=\alpha_1 T$ between the states $|0>$ and $|1>$ and a relative phase of $\Delta\phi_{2\leftrightarrow3}=\alpha_1 T$ between the states $|2>$ and $|3>$. To correct these phases, $\Delta\phi_{0\leftrightarrow1}$ and $\Delta\phi_{2\leftrightarrow3}$ have to be subtracted from the phases $\phi$ of all subsequent pulses in the $0\leftrightarrow1$ and $2\leftrightarrow3$ frames, respectively. Generalizing from this example, under a drive $\mathcal{R}_{n\leftrightarrow n+1}$, the m-th level acquires a phase (ignoring global phases) of $\Delta\phi_{m\leftrightarrow m+1}=((m-n)\omega_n+E_n-E_m)T$ which results in a phase difference of $\Delta\phi_{m\leftrightarrow m+1}=(\omega_m-\omega_n)T$. This defines the necessary phase shift of all following pulses in the $m\leftrightarrow m+1$ frame.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as quantum system measuring code 700. In addition to block 700, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 700, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 700 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 700 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers.

IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for measuring a first N-dimensional quantum system in a given state $\rho_s$ using a positive-operator valued measure (POVM) measurement, the POVM measurement being defined by M measurement operators, the method comprising:

writing the M eigenstates of the POVM measurement in a chosen computational basis of the first quantum system, thereby defining a M×N matrix whose rows are determined by the respective POVM eigenstates;

determining a second M-dimensional quantum system into which the first quantum system is embedded;

determining an initial state $\rho_{ini}$ of the second quantum system which is restricted to the given state $\rho_s$ in the first quantum system;

extending the M×N matrix by adding M−N columns to the M×N matrix such that the resulting M × M matrix U is unitary;

applying a decomposition scheme on the unitary matrix U to enable an experimental realisation of the unitary matrix U based on the decomposition;

transforming the initial state $\rho_{ini}$ to a state $\rho_{ext}$ of the second quantum system by applying to the initial state $\rho_{ini}$ the M×M matrix U according to the decomposition scheme; and measuring the second quantum system in its state $\rho_{ext}$ using a projective measurement in a basis of the second quantum system, thereby determining the probability of the occurrence of an outcome m of the M outcomes of the projective measurement as the probability of the occurrence of the outcome m of the M outcomes of the POVM measurement.

2. The method of claim 1, wherein:

the decomposition scheme is applied such that the M×M matrix U is implementable by external control pulses, and the control pulses are implemented by one of microwave and laser pulses.

3. The method of claim 1, wherein:

the application of the decomposition scheme is performed such that the M×M matrix U is decomposed into a sequence of rotation matrices, and the application of their inverse to the M×M unitary matrix U results in a diagonal matrix.

4. The method of claim 3, wherein:

the sequence of rotation matrices is provided such that the application of their inverse to the M×M unitary matrix U results in the identity matrix, the sequence of rotations comprises a first type of rotation and a second type of rotation;

the first type of rotation is a rotation around a given axis with a rotation angle and with a polar angle; and the second type of rotation is a rotation applying a relative phase.

5. The method of claim 4, wherein:

the application of the sequence of rotations is implemented using sequences of one of microwave and laser pulses; and the first type of rotations is implemented by one of microwave and laser pulses and the second type of rotations is implemented by a phase shift of all subsequent pulses.

6. The method of claim 1, wherein the first quantum system is a qubit system and the second quantum system is a qudit system with M=4 eigenstates.

7. The method of claim 1, wherein the number of measurement operators M is four.

8. The method of claim 1, wherein the POVM measurement is an informationally complete (IC) POVM measurement.

9. The method of claim 1, further comprising resetting the second quantum system to the state $\rho_S$ after measuring the second quantum system in its state $\rho_{ext}$.

10. The method of claim 1, wherein the states $\rho_S$ and $\rho_{ext}$ are one of mixed states and pure states.

11. The method of claim 1, wherein adding M−N columns to the M×N matrix includes performing a Gram-Schmidt procedure.

12. The method of claim 1, wherein:

the POVM measurement is a hardware implemented POVM measurement; and the method further comprises correcting a bias in the POVM measurement, including:

estimating, using quantum detector tomography, the M operators implemented by the hardware-implemented POVM measurement; and correcting, using the estimated hardware-implemented POVM operators, a measured expectation value of an observable.

13. A quantum system of dimension M comprising:

a transmon device, wherein:

the transmon device is in an initial state $\rho_{ini}$ which is restricted to a state $\rho_S$ of a N-dimensional quantum system embedded in the quantum system, where N<M;

the transmon device is configured to receive a sequence of pulses for transforming the initial state $\rho_{ini}$ to a state $\rho_{ext}$ of the quantum system; and the transmon device is connected to a readout that is configured to perform a projective-valued measure (PVM) of the transmon device in its state $\rho_{ext}$.

14. The system of claim 13, wherein a probability of the occurrence of an outcome m of the M outcomes of the PVM is provided as the probability of the occurrence of the outcome m of the M outcomes of a POVM measurement of the N-dimensional quantum system.

15. The system of claim 14, wherein the POVM measurement is an informationally complete (IC) POVM measurement.

16. The system of claim 13, wherein the sequence of pulses is a sequence of one of microwave and laser pulses.

17. The system of claim 13, wherein the system is configured to be reset to the state $\rho_S$ after the PVM of the transmon device in its state $\rho_{ext}$.

18. The system of claim 13, wherein the states $\rho_S$ and $\rho_{ext}$ are one of mixed states and pure states.

19. The system of claim 13, wherein the dimension of the N-dimensional quantum system N is two and the dimension M is four.

20. A computer program product comprising a computer readable storage medium having computer readable program code embodied therewith, the computer readable program code executable by a computer to perform operations comprising:

writing the M eigenstates of the POVM measurement in a chosen computational basis of the first quantum system, thereby defining a M×N matrix whose rows are determined by the respective POVM eigenstates;

determining a second M-dimensional quantum system into which the first quantum system is embedded;

determining an initial state $\rho_{ini}$ of the second quantum system which is restricted to the given state $\rho_S$ in the first quantum system;

extending the M×N matrix by adding M−N columns to the M×N matrix such that the resulting M × M matrix U is unitary;

applying a decomposition scheme on the unitary matrix U to enable an experimental realisation of the unitary matrix U based on the decomposition;

transforming the initial state $\rho_{ini}$ to a state $\rho_{ext}$ of the second quantum system by applying to the initial state $\rho_{ini}$ the M×M matrix U according to the decomposition scheme; and measuring the second quantum system in its state $\rho_{ext}$ using a projective measurement in a basis of the second quantum system, thereby determining the probability of the occurrence of an outcome m of the M outcomes of the projective measurement as the probability of the occurrence of the outcome m of the M outcomes of the POVM measurement.

* * * * *